May 8, 1951 E. E. HESS 2,552,319
ELECTRICALLY ACTUATED INDICATING
MECHANISM FOR WEIGHING SCALES

Filed May 24, 1947 4 Sheets-Sheet 1

Inventor
E. E. Hess
By W. S. McDowell
Attorney

May 8, 1951 E. E. HESS 2,552,319
ELECTRICALLY ACTUATED INDICATING
MECHANISM FOR WEIGHING SCALES

Filed May 24, 1947 4 Sheets-Sheet 3

Inventor
E. E. Hess

By W. S. McDowell
Attorney

May 8, 1951 E. E. HESS 2,552,319
ELECTRICALLY ACTUATED INDICATING
MECHANISM FOR WEIGHING SCALES

Filed May 24, 1947 4 Sheets-Sheet 4

Inventor
E. E. Hess
By W. S. McDowell
Attorney

Patented May 8, 1951

2,552,319

UNITED STATES PATENT OFFICE 2,552,319

ELECTRICALLY ACTUATED INDICATING MECHANISM FOR WEIGHING SCALES

Emerson Eugene Hess, Powell, Ohio

Application May 24, 1947, Serial No. 750,266

7 Claims. (Cl. 265—58)

This invention relates to weighing scales and, more particularly, to an improved indicating mechanism for said scales, said indicating mechanism being of the type utilized for multiplying the motion of a pivoted scale beam or lever, so that the operator of the scale may determine visually, with a high degree of speed and accuracy, when the scale is truly balanced. In one of its preferred adaptations, the present invention is concerned with an indicating attachment for balance scales, particularly platform scales, although, in other adaptations, it may be embodied in and formed to constitute a unitary part of a weighing scale.

In the so-called platform type of scale, in which known or predetermined weights are suspended from one end of a scale beam, with the latter pivotally mounted intermediately of its length, and wherein the opposite end of the beam is linked with a movable platform for the reception of the unknown weight or determinable weight, considerable difficulty is often encountered by scale operators in determining quickly and with required accuracy when the scale is exactly balanced, that is, when the known and unknown weights are equal. Usually, the outer end of the beam of such a scale moves to but a very limited extent when the weights applied thereto are at or near balance, and unless the operator exercises a high degree of skill, care and patience, accurate determinations can not be uniformly made.

It is, therefore, an object of the present invention to provide an attachment for such scales which functions as a means for multiplying the pivotal motion of the weighing beam, so that minute increments of movement on the part of the beam will be clearly discernible through the relatively amplified motion of an associated weight indicator forming a part of the attachment.

Another object of the invention is to provide a balance indicator for weighing scales of the optical type, in which a beam of light is passed through an oscillatory convex lens and reflected by a mirror on a plurality of screens arranged at the front and back of the indicator, a stationary means being arranged in the path of light projection to produce a linear shadow which, by the oscillation of the lens, is caused to move back and forth on the indicator screens in unison with the motion of an associated scale beam.

It is another object of the invention to provide a balance indicator of the optical type in which a plurality of mirrors are provided for directing light beams on indicating screens arranged at the front and rear of the casing of the indicator, so that the indicator may be read from both the front and back thereof.

It is another object of the invention to provide a balance-indicating mechanism for such weighing scales in which is embodied a normally straight coil spring under tension, the spring at approximately the center thereof being connected with a pivotally movable arm, forming a part of the indicator structure, and which arm is adapted to be oscillated in unison with the pivotal movement of an associated scale beam, the spring serving to offer an increased resistance to the oscillation of the indicator arm as the latter moves to either side of a zero or neutral position, and to restore the arm to such a zero or neutral position when forces unbalancing the scale beam or lever have been removed.

It is a further object of the invention to provide in a scale indicator a tension coil spring supported at its ends to occupy normally a straight line position, and in which an oscillating member of the indicating mechanism is joined with the center of the spring in such manner as to apply forces transversely of the spring upon movement of the oscillating member, so that the spring will be further stretched or tensioned to offer an increasing resistance to the oscillation of said member from a neutral position.

It is a further object of the invention to provide in such a scale indicator a plurality of such coil-type tensioning springs arranged in parallel relationship, and to position said springs so that upon initial movement of an oscillating member of the indicator structure one of said springs will be first flexed by forces applied transversely to the center thereof, and thereafter the second and succeeding springs successively flexed to offer an increasing resistance to the movement of the oscillating indicating member as it is deflected to one side or the other from a normal or neutral position in which it is maintained by the spring arrangement.

Still, a further object of the invention is to provide a tension coil spring arrangement for offering resistance to the oscillation of a controlling member of a weight indicating mechanism for balance scales which shall be so constructed and mounted as to be independent of temperature variations ambient to the mechanism.

For a further understanding of the invention, reference is to be had to the following description and the accompanying drawings, wherein.

Figure 1:
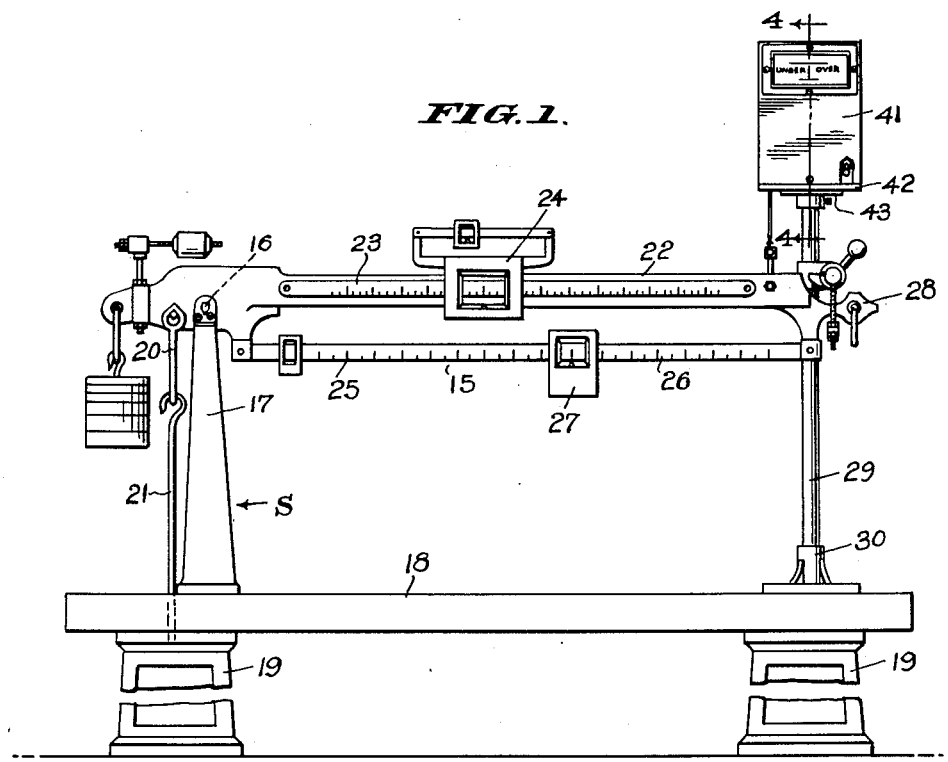
Fig. 1 is a front elevational view of a platform-type of weighing scale provided with the balance-indicating attachment comprising the present invention.

In the accompanying drawings, a platform type of weighing scale has been indicated in its entirety by the letter S. Such a scale is used widely in coal yards and in other localities for weighing loaded trucks and other vehicles. The scale comprises the familiar beam or lever 15 which is pivotally mounted as at 16 on the upper end of a standard 17, the latter being carried by a horizontal frame member 18 supported by vertical frame piers 19. Adjacent to the pivotal point of the beam 15, the latter has connected therewith a bail 20 with which is joined the hook-shaped upper end of a link rod 21, the latter being extended to the weight-receiving platform (not shown) of the scale. In this instance, the beam has been shown as comprising a main arm 22 having a graduated surface 23 representing weights of widely varying range, on which is slidably mounted a main poise 24. Below the main arm 22 and arranged in parallelism therewith is the secondary arm 25 of the scale beam. This arm is provided with the usual graduated surface 26 to indicated fractional units of weight as compared with the surface 23, but with greater width between graduations to provide for accurate reading.

The arm 25 may be provided with one or more sliding poises 27. The outer ends of the arms 22 and 25 may be joined by a neck member 28. The scale part so far described constitutes a conventional design and does not enter directly into the present invention. While such a scale may be used with considerable accuracy by a skilled operator, it usually takes considerable time to adjust the poises to bring the scale beam into balance, and balance is noted when the outer end of the beam oscillates and comes to rest midway between its limits of oscillation. The present invention provides in one of its adaptations an indicating means for enabling such scales to be balanced rapidly and the positions of the beam read with accuracy.

In a preferred form, my improved indicator comprises a post 29 which arises vertically from a base casting 30 mounted on the upper surface of the frame member 18, the post being positioned adjacent to and on one side of the oscillating outer end of the beam 15, containing the neck member 28.

Figure 2:
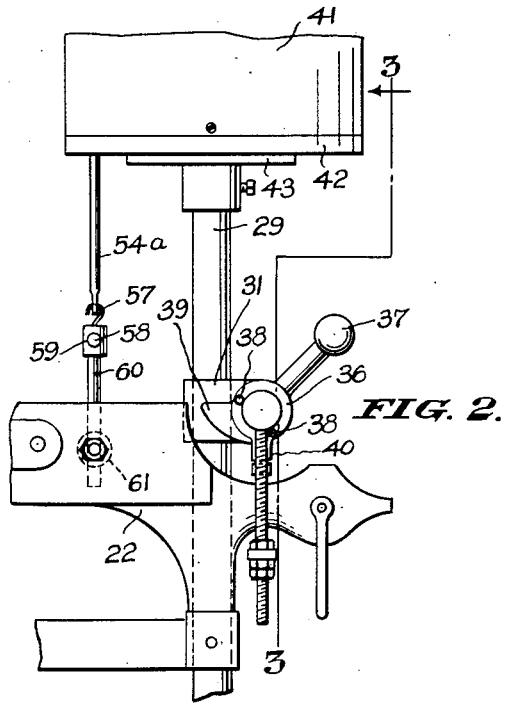
Fig. 2 is a detail or fragmentary front elevational view disclosing the outer end of the scale beam and the connecting means for uniting the same with the balance indicator. In this figure, there is also disclosed an adjustable yoke mechanism for limiting the extent of oscillation of the outer end of the scale beam.
Figure 3:
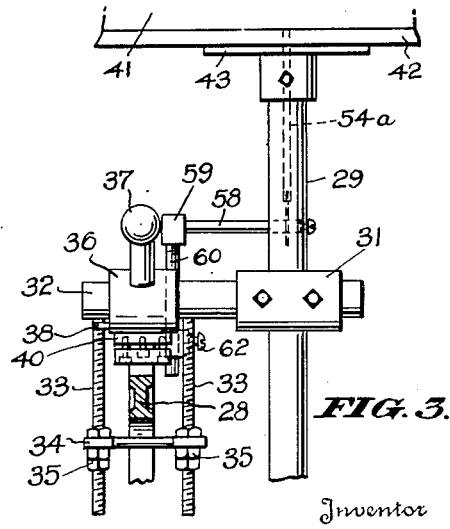
Fig. 3 is a vertical transverse sectional view on the plane disclosed by the line 3—3 of Fig. 2.
Figure 4:
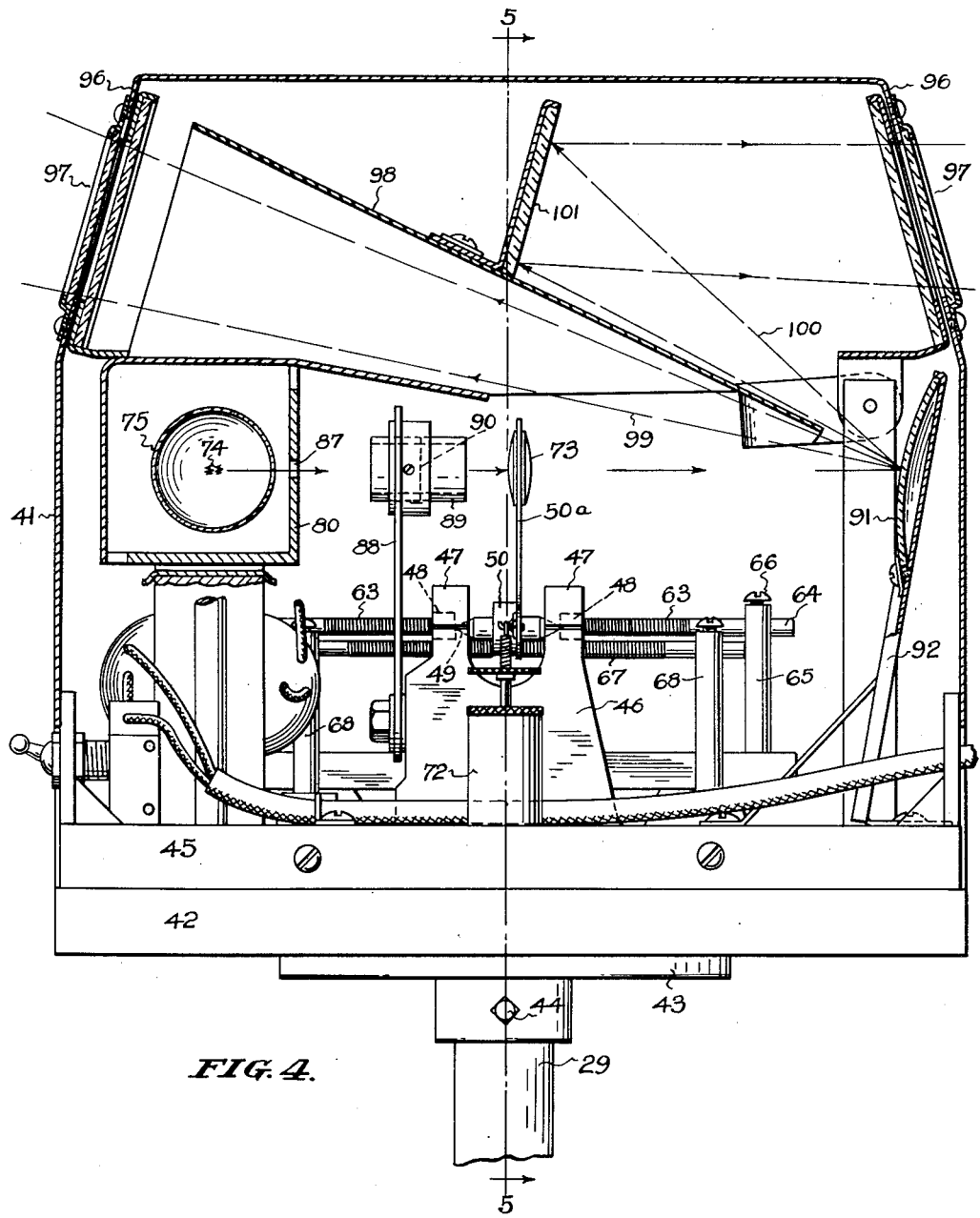
Fig. 4 is an enlarged vertical sectional view taken through the balance indicator on the plane disclosed by the line 4—4 of Fig. 1.
Figure 5:
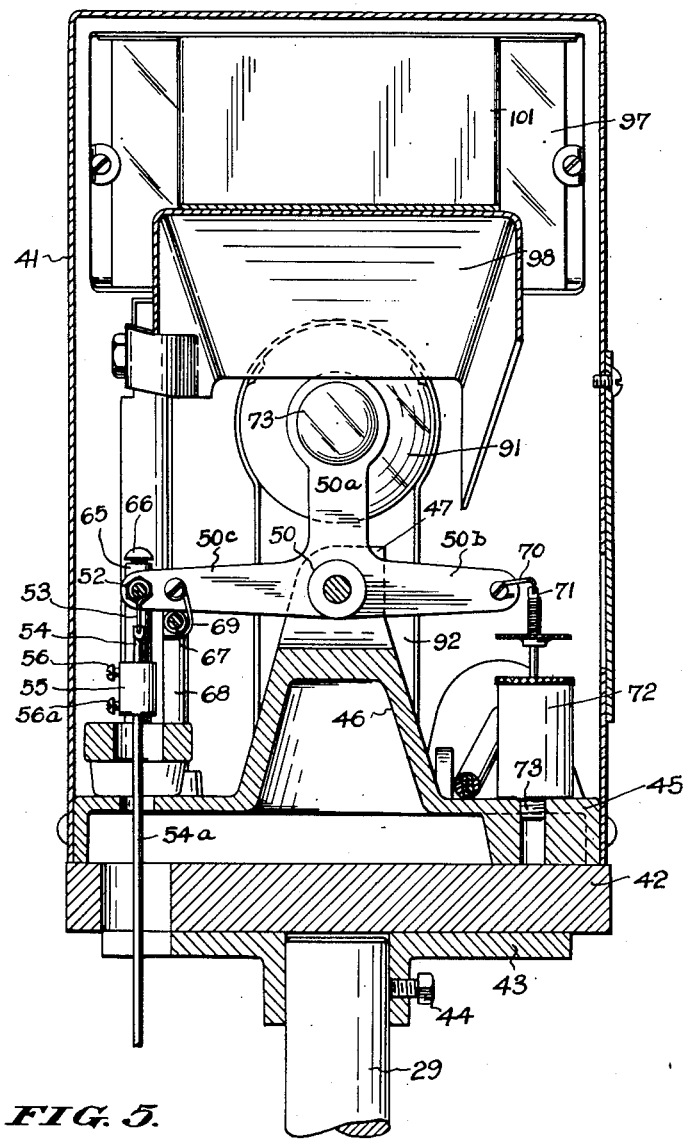
Fig. 5 is a vertical transverse sectional view taken through the indicator on the line 5—5 of Fig. 4.
Figure 6:
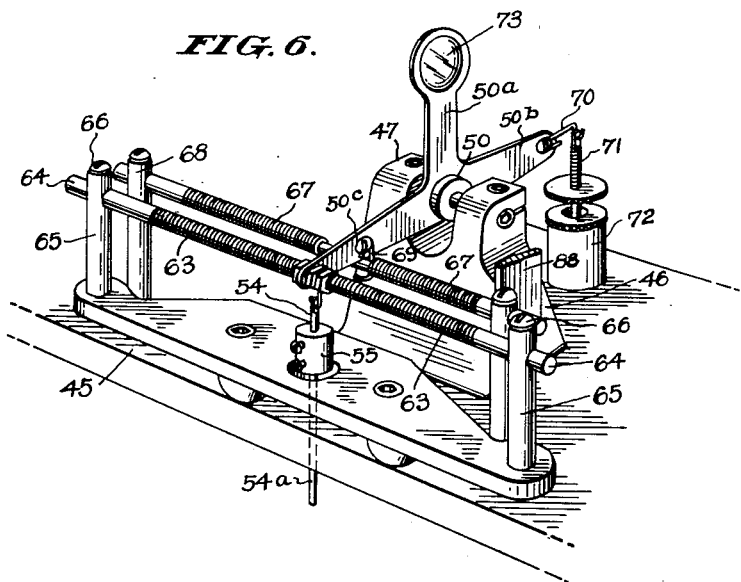
Fig. 6 is a detail perspective view of the coiled tension-type resistance springs employed in connection with the indicator.

As shown in Figs. 1, 2 and 3, the stationary post 29 carries a vertically adjustable bracket 31 having a stud shaft 32. Depending from the shaft 32 are parallel, transversely spaced, screw-threaded members 33, between which the connecting neck 28 of the beam is positioned for oscillation. Beneath the neck 28, the members 33 carry a cross link 34, the ends of which are apertured to receive the members 33. Nuts 35, mounted on the screw members 33, control the positions of the link 34 with respect to the neck member 28, and thereby limit adjustably the extent of rocking movement of the outer end of the beam in a downward direction.

Mounted for rocking movement on the stud shaft 32 is a sleeve 36, having a handle 37. Spaced pins 38 project from one end of the sleeve 36 for engagement with one of the screw members 33. Formed with the sleeve 36 are radially projecting lugs 39 and 40, the former being longer than the latter. With the lug 40 positioned as shown in Fig. 2, full oscillation of the scale beam may take place within the adjustably controlled limits. When the sleeve is rocked to an extent controlled by the spacing of the pins 38 in a direction bringing the lug 39 into active operation, the extent of oscillation of the beam is limited or arrested altogether.

The upper end of the post 29 carries the indicator casing 41. This casing comprises a bed plate 42, the under surface of which is equipped with a flanged collar 43 which receives the upper end of the post 29 and is held in connection therewith by a set screw 44. Positioned on the upper surface of the plate 42 is a base casting 45, which includes a standard 46 having bifurcated upper ends 47. These ends carry adjustable bearing blocks 48, which receive the pointed ends 49 of an inverted T-shaped oscillating lens carrier or pivoted member 50. The carrier is formed to provide arms 50a, 50b and 50c, the entire carrier rocking about the horizontal axis provided by the pointed or needle shaped ends 49 thereof.

Figure 7:
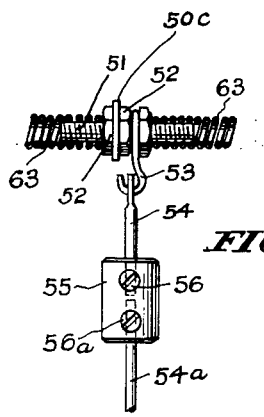
Fig. 7 is a detail elevational view, partly in vertical section, disclosing the mechanical union between the coil springs and the outer end of an oscillating member of the balance indicator and also the connection between said member and the associated rod mechanism which unites the oscillating member with the scale beam.

At its outer end, the arm 50c of the oscillating lens carrier is apertured to receive a screw threaded stud 51, as shown in Fig. 7, the latter being held in connection with the arm 50c by means of the lock nuts shown at 52. The stud 51 carries a pivoted hook 53, the lower end of which is received in an eye provided in a rod 54. The lower end of the rod 54 enters an axial bore provided in a counterbalancing weight 55 and is held therein by a set screw 56. A continuing rod 54a has its upper end positioned in the bore of the weight 55 and held therein by the screw 56a. The lower end of the rod 54a, as shown in Figs. 2 and 3, is formed with an eye for the reception of a hook 57 carried by one end of a horizontal rod 58, the latter being disposed between the laterally offset vertical operating planes of the oscillatory member 50 and the scale beam structure. The end of the rod 58 opposite to that carrying the hook 57 is held in a bore provided in a head 59. From this head, there depends a vertical stem 60 which is received within a bore provided in a lug 61 carried by the outer end of the main arm 22 of the scale beam 15. A set screw 62 may be used for adjusting and holding the adjustment of the stem 60 vertically with respect to the lug 61. By these means, it will be seen that as the scale beam oscillates, corresponding motion will be imparted to the oscillating lens carrier 50. The connections between the scale beam and the lens carrier are readily adjustable and permit of convenience in application and attachment of the indicating mechanism in operative relation with the scale proper.

To yieldably resist oscillation of the lens carrier 50 from its normal or neutral position or to maintain the carrier in such a normal or neutral position when the scale is unloaded, the threaded ends of the stud 51 are received within the relatively tightly wrapped coils of a pair of aligned coil springs 63. The outer or opposite ends of these springs are connected with pins 64, which are slidably received in horizontal openings formed in vertical posts 65, arising from the base casting 45. Set screws 66 are carried by the upper ends of the posts 65 and engage the pins 64 for the purpose of maintaining the latter in various positions of adjustment for holding the springs 63 under tension.

The springs 63 are adapted to be stretched out to a certain point of tension by the adjusting means 64, 65 and 66, and the movement of the scale beam and the arm 50c cause the center of the spring assembly to be forced or moved to one side or the other away from the straight line which the spring assembly normally assumes. The spring assembly is stretched when it is moved away from its neutral or balanced position by being moved out of a straight line condition and the greater the spring is stretched, the more resistant it becomes. If desired, one or more additional or auxiliary springs 67 may be used, which are supported by posts 68 in parallelism with the spring assembly 63. The auxiliary springs may be heavier than the main springs 63 and so positioned that said auxiliary springs will be flexed after certain initial flexure of the spring 63 has taken place. Downward deflection of the springs 67 takes place through contact with the lens arm 50c and upward flexure is secured by means of a hook 69 attached to the arm 50c. It will be noted that these springs are so arranged that temperature variations will not alter the positions of the springs with relation to the scale when the latter is in a position of balance. Hence, an accurate balance reading is obtainable even if temperatures vary greatly.

The arm 50b is formed with a hook extension 70, the outer end of which is connected the upper end of the reciprocatory stem 71 of a vibration damping dashpot 72. The base of the casing of the dashpot is formed with a threaded extension 73, which is received within the threaded bore provided in the base casing 45.

Figure 8:
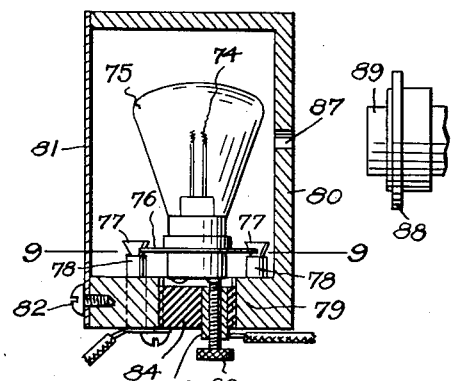
Fig. 8 is a detail horizontal sectional view disclosing the light source and mounting therefor used in the balance indicator.
Figure 9:
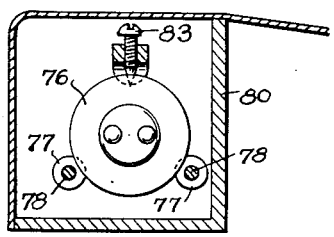
Fig. 9 is a horizontal sectional view on the line 9—9 of Fig. 8.

Mounted in the upper end of the arm 50a is a double convex lens 73, forming a part of an optical indicator. When normally positioned, the axis of this lens is disposed in longitudinal registration with the filaments 74 of an incandescent bulb 75. The base of this bulb is provided with an annular flange 76, and the peripheral edge of one side is seated in the tapering heads 77 of a pair of posts 78 carried by a vertical end wall 79 of a lamp housing 80, the latter being mounted in the lens casing 41. The housing 80 is formed with a removable wall 81 to provide access to the interior of the housing, one or more screws 82, as shown in Fig. 8, being employed to retain the wall 81 in position. A set screw 83 engages the base of the bulb 75 to force the latter longitudinally and hold the flange 76 thereof in a seated position in the tapered heads 77 of the posts 78.

The housing includes a bushing 84 in which is held an internally threaded sleeve 85, the latter receiving an adjustable terminal-engaging screw 86, the inner end of which is adapted to be held in engagement with one of the filament contacts on the base of the bulb 75. By this arrangement, the bulb may be conveniently supported in the lamp housing, maintained in fixed focal relationship to the lenss 73 and conveniently replaced whenever substitution of bulbs is required. One of the vertical walls of the lamp housing is formed with an opening 87 through which light, emanating from the lamp bulb may be projected in beam formation toward the lens 73.

Mounted on the standard 46 is a bracket structure 88, which carries at its upper end an open-ended barrel 89, the axis of which is arranged in alignment with the light source 75, the opening 87 and the lens 73. Within the barrel, there is disposed a fixed vertical transversely extending fine wire 90, adapted to produce a shadow line.

The light beam, after passing through the lens 73, is projected on the convex or cylindrical surfaces of a mirror 91, which is stationarily supported by the frame structure 92 in the casing 41.

The top 93 of the casing is formed with angularly disposed sloping walls 96, the latter being formed with openings which are covered by means of transparent or translucent panels 97, one of these panels being arranged at the front of the casing 41 and the other at the rear. Each of these panels, as shown in Fig. 1, contains graduations indicating balanced and under and over weights. Within the top structure 93, the casing 41 is provided with an inclined divisional wall 98, which terminates in spaced relation from the curved surfaces of the mirror 91. The relationship of the wall 98 to the mirror 91 is such that a part of the light contacting the mirror will be split to produce beams indicated at 99 and 100. The beams 99 are disposed below the wall 98 and pass forwardly through the panel 97 at the front of the casing 41, while the beams 100 pass above the wall 98 and contact a plain mirror 101, which is mounted on the top of the wall 98 in a slightly inclined position with respect to the vertical. The mirror 101 reverses the direction of light propagation of the beams 100 so that the same are directed rearwardly and substantially horizontally toward the rear indicating panel 97. By this construction, the indicating mechanism may be read from both the front and rear of an associated scale.

It will be evident that as the scale beam is deflected from a position of true balance, corresponding rocking movement will take place on the part of the lens 73, refracting the light passed therethrough so that the shadow produced by the wire or hair line 90, and reflected by the mirrors 91 and 101, will appear to move linearly to one side or the other of the center of the panels 97. When the scale beam is in true balance, the shadows will be exactly in the center of the panels 97 and any deviation of these shadows from the center position will disclose to the operator the out-of-balance condition of the scale beam. The movement of the shadows is, of course, greatly magnified with respect to the corresponding degrees of movement of the outer end of the scale beam through the double convex lens 73, so that the operator will have no difficulty in determining exactly when the scale is in balance.

I claim:

1. In a balance-indicating mechanism for weighing scales, a housing having a base supported adjacent to an oscillating end of an associated scale beam, a member mounted on said base for turning movement about a pivotal axis, link means uniting the oscillating end of the scale beam with said pivotal member to cause the latter to oscillate in unison with said beam, a resistance for resisting movement of said member away from a normal position which it occupies when said beam assumes a position of balance, said resistance including a flex formed from a pair of longitudinally aligned coil springs disposed in a plane intersecting perpendicularly the plane of oscillation of said member, means rigidly securing the outer ends only of said springs to spaced base-carried supports, and means connecting the inner adjacent ends of said springs directly with said member at positions spaced radially from its axis of turning movement.

2. A balance-indicating attachment for weighing scales of the platform type, a housing including a base supported on the frame of an associated scale adjacent to an oscillating end of the scale beam, a member mounted on said base within said housing for turning movement about a pivotal axis, adjustable link means uniting the oscillating end of the scale beam with said pivotal member to cause the latter to oscillate in unison with said beam, a resistance for resisting movement of said member away from a normal position which it occupies when said beam assumes a position of balance, said resistance including a flex composed of a pair of longitudinally aligned coil springs arranged in a plane intersecting that in which said pivotal member oscillates, means connecting the outer ends of said springs to said base, and means connecting the inner adjacent ends of said springs directly with said member at positions spaced radially from its axis of turning movement.

3. A balance-indicating mechanism for weighing scales comprising: a member mounted for turning movement about a pivotal axis, link means uniting an associated scale beam with said pivotal member to cause the latter to oscillate in unison with said beam, a resistance for resisting movement of said member away from a normal position which it occupies when said beam assumes a position of balance, said resistance including a flex in the form of a longitudinally extending contractile spring, spaced stationary supports to which the outer ends of said spring are secured, and means connecting said pivotal member at a position spaced radially from its pivotal axis of turning movement to the central portion of said spring.

4. A balance-indicating mechanism for weighing scales comprising: a scale beam actuated member mounted for turning movement about a pivotal axis, a resistance for resisting movement of said member away from a normal position which it occupies when the associated scale beam assumes a position of balance, said resistance including a flex in the form of longitudinally extending contractile coil spring means, spaced stationary supports to which the outer ends of said coil spring means are secured, means connecting said pivotal member at a position spaced radially from its pivotal axis of turning movement to the central portion of said coil spring means, and means for varying the tension of said coil spring means.

5. A balance-indicating mechanism for weighing scales comprising: an indicator housing supported on and adjacent to the frame of an associated scale, an indicator member mounted in said housing for turning movement about a pivotal axis, link means uniting an associated scale beam with said indicator member to cause the latter to oscillate in unison with said beam, a resistance for resisting movement of said member away from a normal position which it occupies when said beam assumes a position of balance, said resistance including a flex in the form of a longitudinally extending contractile spring of the coil type, spaced stationary supports to which the outer ends of said coil spring are secured, and means joining said indicator member with the intermediate portion of said spring between the supported ends thereof whereby to flex and stretch said spring when said indicator member is rocked by said beam.

6. A balance-indicating attachment for weighing scales of the type embodying a pivotally movable beam, comprising a housing having a base supported adjacent to an oscillating end of said beam, an indicator member mounted on said base for turning movement about a pivotal axis, link means uniting the oscillating end of the scale beam with said indicator member to cause its oscillation in unison with said beam, a resistance for resisting movement of said member away from a normal position which it occupies when said beam assumes a position of balance, said resistance including a set of longitudinally aligned coil springs disposed in a plane intersecting perpendicularly the plane of oscillation of said member, means securing said springs to said member and to said base, whereby the springs are flexed upon oscillation of said member, and a second set of springs arranged parallel and adjacent to said first-named set of springs and cooperative with said indicator member to offer an increasing resistance to movement of said member away from its normal position following predetermined movement thereof under the influence of said first-named set of springs only.

7. A balance-indicating mechanism for weighing scales embodying a pivotally movable beam, a housing having a base supported adjacent to an oscillating end of said beam, an inverted substantially T-shaped indicator member mounted on said base for turning movement about a pivotal axis, said member including a plurality of arms radiating from said pivotal axis, link means uniting the outer end of one of said arms with said scale beam to effect oscillation of said member in unison with said beam, a longitudinally extending contractile coil spring means disposed in a plane intersecting perpendicularly the plane of oscillation of the arm of said member linked with said beam and joined with said last-named arm to offer an increasing resistance to movement of the member from its normal poistion, a dashpot connected with an outer end of a second arm of said member, and a third arm formed with said member in substantially perpendicular relation to the first and second-named arms.

EMERSON EUGENE HESS.

(References on following page)

REFERENCES CITED

The following references are of record in the file of this patent:

UNITED STATES PATENTS

| Number | Name | Date |
|---|---|---|
| 1,502,443 | Schaper | July 22, 1924 |
| 1,772,294 | Smith | Aug. 5, 1930 |
| 1,800,017 | Hamblin et al. | Apr. 7, 1931 |
| 1,807,645 | Walker | June 2, 1931 |
| 1,812,937 | Dollack | July 7, 1931 |
| 1,864,565 | Walker | June 28, 1932 |
| 2,009,019 | Flanagan | July 23, 1935 |
| 2,014,282 | Howard | Sept. 10, 1935 |
| 2,068,255 | Woodland | Jan. 19, 1937 |
| 2,244,523 | Hess | June 3, 1941 |
| 2,388,912 | Haferl | Nov. 13, 1945 |